(12) United States Patent
Rousseau

(10) Patent No.: US 10,605,208 B2
(45) Date of Patent: Mar. 31, 2020

(54) ENGINE SYSTEM WITH EXHAUST GAS RECIRCULATION, AND METHOD OF OPERATING THE SAME

(71) Applicant: Modine Manufacturing Company, Racine, WI (US)

(72) Inventor: Tony Rousseau, Racine, WI (US)

(73) Assignee: MODINE MANUFACTURING COMPANY, Racine, WI (US)

( * ) Notice: Subject to any disclaimer, the term of this patent is extended or adjusted under 35 U.S.C. 154(b) by 71 days.

(21) Appl. No.: 15/761,898

(22) PCT Filed: Sep. 21, 2016

(86) PCT No.: PCT/US2016/052828
§ 371 (c)(1),
(2) Date: Mar. 21, 2018

(87) PCT Pub. No.: WO2017/053390
PCT Pub. Date: Mar. 30, 2017

(65) Prior Publication Data
US 2018/0274498 A1   Sep. 27, 2018

Related U.S. Application Data

(60) Provisional application No. 62/232,569, filed on Sep. 25, 2015.

(51) Int. Cl.
*F02M 26/33* (2016.01)
*F02M 26/24* (2016.01)
(Continued)

(52) U.S. Cl.
CPC ........... *F02M 26/33* (2016.02); *F01K 23/065* (2013.01); *F01K 23/10* (2013.01);
(Continued)

(58) Field of Classification Search
CPC .. F02M 26/33; F02M 26/41; F02M 35/10222; F02M 26/44; F02M 26/05;
(Continued)

(56) References Cited

U.S. PATENT DOCUMENTS 6,367,256 B1 * 4/2002 McKee ................. F02M 26/05
123/568.12
7,011,080 B2    3/2006 Kennedy
(Continued)

FOREIGN PATENT DOCUMENTS

WO        2015066674 A1    5/2015

*Primary Examiner* — Hoang M Nguyen
(74) *Attorney, Agent, or Firm* — Michael Best & Friedrich LLP; Jeroen Valensa; Michael Bergnach

(57) ABSTRACT

An engine system with exhaust gas recirculation includes a combustion engine, a flow mixer, and a turbocharger. An exhaust flow path and a charge air flow path each extend to an inlet of the flow mixer, and a mixed gas flow path extends between the outlet of the flow mixer and an intake manifold of the engine. A charge air heat exchanger is arranged along the charge air flow path to cool the charge air, and a mixed gas heat exchanger is arranged along the mixed gas flow path to cool mixed charge air and recirculated exhaust gas. The exhaust gas recirculation flow path does not extend through any heat exchangers.

19 Claims, 4 Drawing Sheets

(51) Int. Cl.

| | |
|---|---|
| *F02M 26/02* | (2016.01) |
| *F02M 26/23* | (2016.01) |
| *F02M 26/22* | (2016.01) |
| *F02M 26/41* | (2016.01) |
| *F02M 35/10* | (2006.01) |
| *F02B 29/04* | (2006.01) |
| *F02G 5/00* | (2006.01) |
| *F02M 26/05* | (2016.01) |
| *F02M 26/19* | (2016.01) |
| *F02M 26/44* | (2016.01) |
| *F01K 23/06* | (2006.01) |
| *F01K 23/10* | (2006.01) |

(52) U.S. Cl.
CPC ...... *F02B 29/0412* (2013.01); *F02B 29/0425* (2013.01); *F02B 29/0437* (2013.01); *F02B 29/0443* (2013.01); *F02B 29/0493* (2013.01); *F02G 5/00* (2013.01); *F02M 26/02* (2016.02); *F02M 26/05* (2016.02); *F02M 26/19* (2016.02); *F02M 26/22* (2016.02); *F02M 26/23* (2016.02); *F02M 26/24* (2016.02); *F02M 26/41* (2016.02); *F02M 26/44* (2016.02); *F02M 35/10222* (2013.01); *Y02T 10/146* (2013.01); *Y02T 10/166* (2013.01)

(58) Field of Classification Search
CPC ........ F02M 26/19; F02M 26/02; F02M 26/24; F02M 26/23; F02M 26/22; F02G 5/00; F02B 29/0437; F02B 29/0443; F02B 29/0493; F02B 29/0412; F02B 29/0425; F01K 23/065; F01K 23/10; Y02T 10/166; Y02T 10/146

USPC .................................. 60/602, 605.2
See application file for complete search history.

(56) References Cited

U.S. PATENT DOCUMENTS

| | | | |
|---|---|---|---|
| 7,451,749 B2 | 11/2008 | Kardos | |
| 7,461,641 B1 | 12/2008 | Styles et al. | |
| 7,464,700 B2 | 12/2008 | Kolb | |
| 7,721,542 B2* | 5/2010 | Chen | F02M 35/10157 123/568.17 |
| 8,061,335 B2 | 11/2011 | Auffret et al. | |
| 8,146,542 B2 | 4/2012 | Cattani et al. | |
| 8,522,756 B2 | 9/2013 | Vuk et al. | |
| 8,590,599 B2 | 11/2013 | Kardos et al. | |
| 8,602,007 B2 | 12/2013 | Wu | |
| 2006/0185364 A1 | 8/2006 | Chalgren et al. | |
| 2006/0278377 A1 | 12/2006 | Martins et al. | |
| 2007/0039597 A1* | 2/2007 | Zukouski | F02M 35/10222 123/568.17 |
| 2008/0190403 A1 | 8/2008 | Grunenwald et al. | |
| 2010/0037608 A1 | 2/2010 | Dierbeck | |
| 2010/0095941 A1 | 4/2010 | Auffret et al. | |
| 2011/0162360 A1 | 7/2011 | Vaught et al. | |
| 2011/0185991 A1 | 8/2011 | Sheidler et al. | |
| 2012/0216530 A1* | 8/2012 | Flynn | F02M 35/10222 60/605.2 |
| 2014/0373528 A1* | 12/2014 | Gerty | F02M 26/05 60/599 |

\* cited by examiner

ENGINE SYSTEM WITH EXHAUST GAS RECIRCULATION, AND METHOD OF OPERATING THE SAME

CROSS-REFERENCE TO RELATED APPLICATIONS

This application claims priority to U.S. Provisional Patent Application No. 62/232,569, filed Sep. 25, 2015, the entire contents of which are hereby incorporated by reference.

BACKGROUND

Combustion engines to produce mechanical work through the combustion of a fuel with oxygen have long been known in the art. Particularly well-known modern-day application of such combustion engines are as prime movers for vehicles. Most often in such applications, a liquid or gaseous fuel is injected into an entrained flow of ambient air and is combusted thereby within one or more cylinders of the engine, producing mechanical power transmitted to a rotating shaft and exhaust products to be removed from the engine.

In an effort to improve the power density of the engine (i.e. the engine power produced divided by the swept volume of the engine cylinders), the rate of throughput of air and fuel through the engine can be increased by compressing the air to a higher density. Such boosting of power density can be economically achieved by recapturing otherwise lost energy remaining in the exhaust products after they have been removed from the engine, a process commonly referred to as turbocharging.

Efforts have also been made to reduce the environmental impact of the exhaust products of such engines. The exhaust products often include elevated concentrations of oxides of nitrogen (NOx) formed by reaction between the oxygen and nitrogen within the oxidizing air flow at the elevated temperatures. NOx formation is generally undesirable, as these oxides are known to react with other chemicals to produce ground-level ozone, a health hazard. As one means of reducing such pollutants, a method of operating the combustion engine whereby a portion of the oxygen-depleted exhaust from the engine is recirculated back to the engine cylinders along with the fresh air and fuel. The extra mass of the essentially inert recirculated exhaust gas increases the heat capacity of the gases within the cylinder without impacting the oxygen:fuel ratio, thereby decreasing the peak combustion temperature and reducing the concentration of NOx within the exhaust. In order to further reduce the peak combustion temperatures (to thereby further decrease the concentration of NOx), both the recirculated exhaust gas and the compressed combustion air are commonly cooled to reduce their temperature prior to their entry into the engine. As an additional benefit, the density of the air and recirculated exhaust gas is also increased by reducing their temperatures, leading to further increase in engine power density and improved fuel economy.

A typical system of the type described is depicted in schematic fashion in FIG. 1. Such an engine system 51 includes an engine 52 having an intake manifold 53 and an exhaust manifold 54. A portion of the exhaust from the engine 52 is routed from the exhaust manifold 54 to an expansion turbine 56, which is coupled to a compressor 57 and which, together with the compressor 57, forms a turbocharger 55. Combustion air is drawn in and compressed by the compressor 57 and is routed to the intake manifold 53 of the engine 52 along a flow path 63. A charge air cooler 64 is arranged along the flow path 63 and allows for cooling of the compressed charge air by rejecting heat to a cooling flow 68. A remainder of the exhaust flow is directed from the exhaust manifold 54 to the intake manifold 53 along a recirculated exhaust gas flow path 65. An exhaust gas recirculation cooler 69 is arranged along the flow path 65 and allows for cooling of the exhaust gas by rejecting heat to a cooling flow 71. An exhaust gas recirculation valve 70 is additionally arranged along the flow path 65 to control the amount of exhaust that is being recirculated.

In such a system, the cooling stream 68 used to cool the compressed charge air is typically ambient air. To minimize the pollutant emissions, engine manufacturers typically target a charge air temperature into the intake manifold at several degrees above the ambient temperature, typically referred to as an intake manifold temperature differential or IMTD. Typical target values for IMTD are in the range of five to ten degrees Celsius. Achieving such low temperature differentials is most easily achieved by using the ambient air to directly cool the charge air, for example by arranging the charge air cooler 64 at the front of the vehicle where it can receive ram air from the forward motion of the vehicle.

Cooling the recirculated exhaust gas is more difficult, however, due to the elevated temperature of the exhaust exiting the exhaust manifold. These elevated temperatures can be damaging to surrounding components, and it is desirable to therefore locate the exhaust gas recirculation cooler 69 as close to the engine as possible, frequently directly abutting the engine. Use of ambient air as the cooling stream 71 is therefore frequently not feasible, and engine coolant is thus the predominant cooling stream used for the exhaust gas recirculation cooler. As such engine coolant is typically regulated to a temperature of around 100° C., the recirculated exhaust gas is typically delivered to the intake manifold at a substantially higher temperature than the cooled charge air, resulting in a mixed gas temperature within the intake manifold that is typically twenty or more degrees Celsius above the ambient temperature.

In addition, care must be taken to construct the exhaust gas recirculation cooler 69 from a material capable of withstanding the high temperatures that are associated with the exhaust of an internal combustion engine. In most cases, this requires that the heat exchanger 69 is constructed of a stainless steel alloy in order to ensure appropriate life of the heat exchanger in such a challenging operating environment. Stainless steel is, however, undesirable as a material of construction due to its high weight and cost. Thus, there is still room for improvement.

SUMMARY

As one object of the invention, an engine system and method of operation capable of achieving low mixed gas intake manifold temperature differentials in order to maximize engine power density and minimize pollutant emissions is enabled. As another object of the invention, an engine system with cooled exhaust gas recirculation that avoids the need for stainless steel heat exchangers is enabled.

According to an embodiment of the invention, an engine system with exhaust gas recirculation has a combustion engine, a flow mixer, and a turbocharger. An exhaust flow path extends between the exhaust manifold of the engine and an exhaust turbine of the turbocharger. A charge air flow path extends between an air compressor of the turbocharger and an inlet of the flow mixer. An exhaust gas recirculation flow path extends between the exhaust manifold and another inlet of the flow mixer. A mixed gas flow path extends between the outlet of the flow mixer and the intake manifold of the engine. A charge air heat exchanger is arranged along the charge air flow path to cool the charge air, and a mixed gas heat exchanger is arranged along the mixed gas flow path to cool mixed charge air and recirculated exhaust gas. The exhaust gas recirculation flow path does not extend through any heat exchangers.

In some embodiments, the charge air heat exchanger is a liquid-cooled heat exchanger and is additionally located along a portion of an engine coolant circuit. In some embodiments the mixed gas heat exchanger is an air-cooled heat exchanger.

In some embodiments the mixed gas heat exchanger is one of a plurality of mixed gas heat exchangers along the mixed gas flow path. In some such embodiments at least some of the plurality of mixed gas heat exchangers are located along a portion of a common heat receiving fluid circuit. In some such embodiments the common heat receiving fluid circuit is part of a waste heat recovery bottoming cycle of the engine system. In some such embodiments the waste heat recovery bottoming cycle is a Rankine cycle.

In some embodiments of the invention, a second flow mixer is provided. A second exhaust gas recirculation flow path extends between the exhaust manifold and an inlet of the second flow mixer. Another inlet of the second flow mixer receives mixed gas that has been cooled in the mixed gas heat exchanger. A second mixed gas heat exchanger is arranged downstream of the outlet of the second flow mixer, and further cools the recirculated exhaust gas and the charge air prior to entry into the intake manifold.

In some such embodiments the two mixed gas heat exchangers are cooled by different cooling flows, and in some of those embodiments the cooling flow for the second mixed gas heat exchanger is ambient air. In some such embodiments a valve is located along both of the exhaust gas recirculation flow paths. The valve can, in some embodiments, be operated in response to a mixed gas temperature entering the first mixed gas heat exchanger.

According to another embodiment of the invention, a method of operating an engine system includes receiving a flow of uncooled exhaust gas from an exhaust manifold of the engine system and splitting it into an un-recirculated portion and a recirculated portion. Energy from the un-recirculated portion is recovered and used to pressurize a flow of charge air. The charge air is cooled and is mixed with at least some of the recirculated portion of uncooled exhaust gas. Heat is rejected from the mixed gas, and the cooled mixed gas is delivered to an intake manifold of the engine.

In some embodiments, the mixed gas is cooled to an intake manifold temperature differential of no more than fifteen degrees Celsius, and in some embodiments to no more than ten degrees Celsius.

In some embodiments, rejecting heat from the mixed gas includes passing the mixed gas and ambient air through a mixed gas heat exchanger and transferring heat from the mixed gas to the ambient air. In some such embodiments that mixed gas heat exchanger is a terminal one of a plurality of mixed gas heat exchangers through which the mixed gas travels before reaching the intake manifold.

In some embodiments the temperature of the mixed gas is measured after combining at least some of the recirculated exhaust gas with the cooled charge air to form the mixed gas, but before heat is rejected from the mixed gas. The amount of the recirculated portion of the exhaust gas that is combined with the cooled charge air is adjusted in response to the measured temperature in order to regulate that temperature. Any remaining portion of the recirculated exhaust gas is then combined with the mixed gas after heat has been rejected from the mixed gas. In some such embodiments additional heat is rejected from the charge air and recirculated exhaust gas after the remaining recirculated exhaust gas has been combined with the mixed gas.

In some embodiments, a flow of liquid working fluid is pressurized, heated to form a superheated vapor, and then expanded to recover energy and condensed to return it to a liquid state. At least a portion of the heat used to for the superheated vapor is heat rejected from the mixed gas to cool the mixed gas. In some such embodiments the mixed gas is passed through a first and then a second mixed gas heat exchanger. The working fluid is heated by first passing it in a liquid state through the second mixed gas heat exchanger, thereby heating the working fluid and cooling the mixed gas. The working fluid is subsequently passed through the first mixed gas heat exchanger in order to fully heat the working fluid using the mixed gas, so that the working fluid exits the first mixed gas heat exchanger as a superheated vapor. In some such embodiments the working fluid is additionally passed through another heat exchanger between passing through the second and the first heat exchanger in order to further heat the working fluid. In some such embodiments the working fluid is heated in that other heat exchanger using either un-recirculated exhaust gas or engine coolant.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
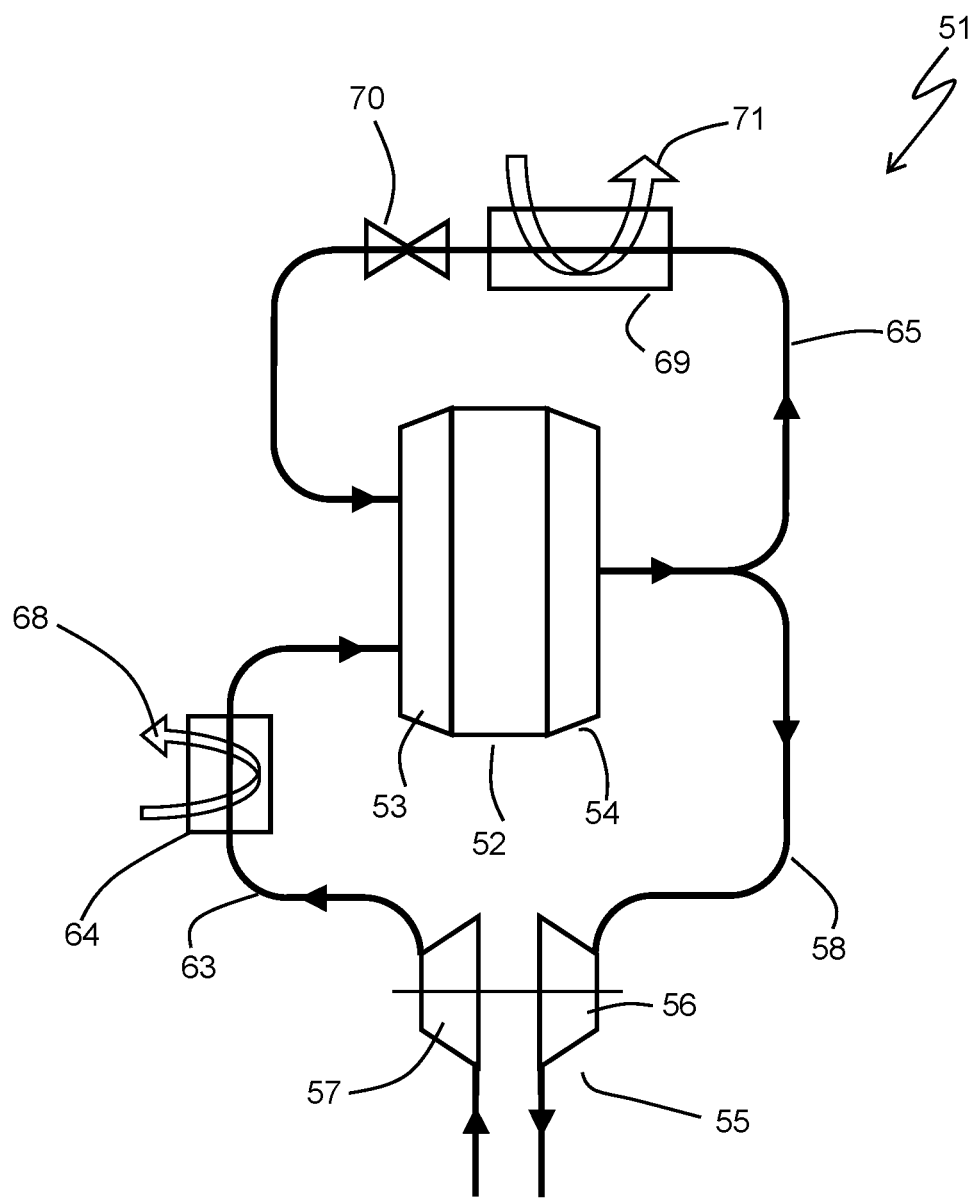
FIG. 1 shows, in schematic form, a typical engine system with exhaust gas recirculation as known in the prior art.
Figure 2:
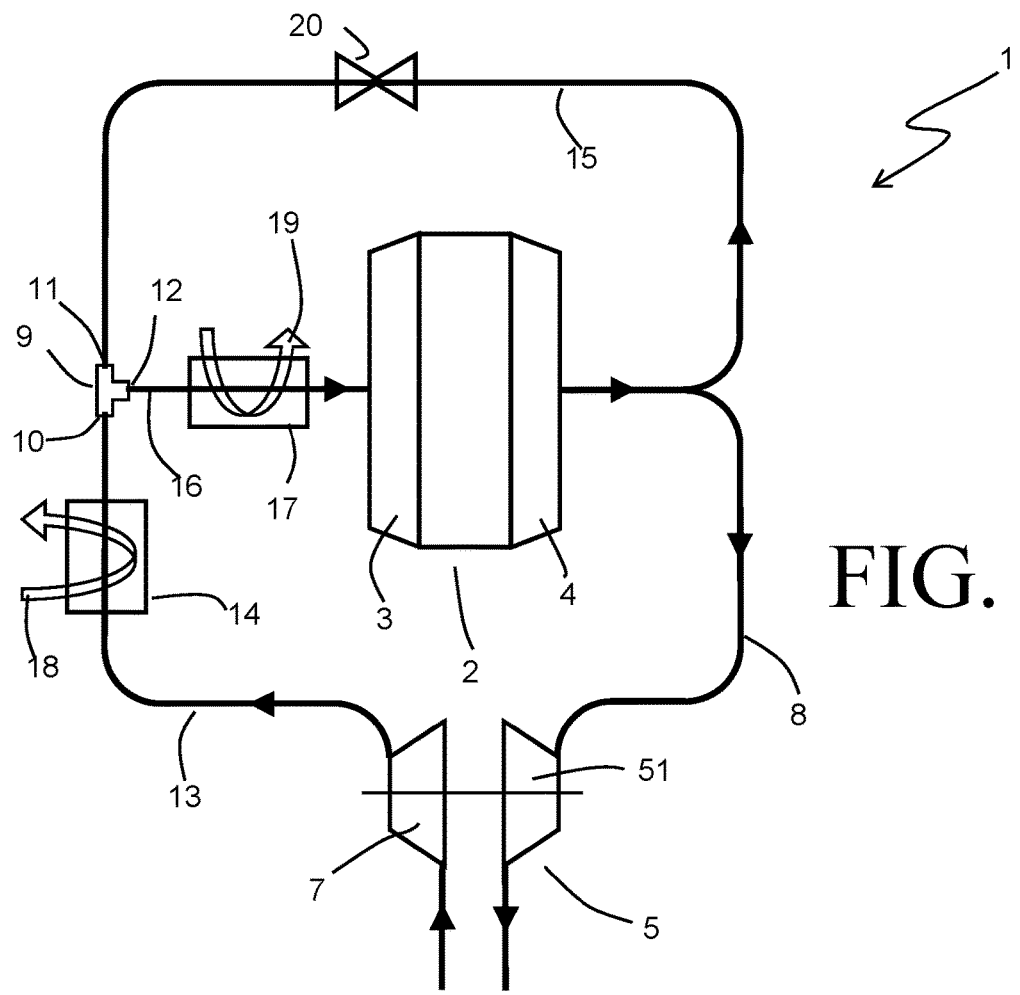
FIG. 2 is a schematic diagram of an engine system according to an embodiment of the present invention.

FIG. 2 depicts, in schematic fashion, an exemplary embodiment of an engine system 1 according to the present invention. The engine system 1 may find utility in a variety of applications, including road vehicles (e.g. automobiles, trucks, buses, and the like), off-highway and construction vehicles (e.g. tractors, harvesters, combines, excavators, front-end loaders, quarry trucks, and the like), stationary generator sets, and many more. In some especially preferable embodiments the engine system 1 operates on the Diesel cycle, but it should be understood that the invention can equally apply to other power cycles, including (by way of example and without limitation) the Otto cycle, the Atkinson cycle, and the Brayton cycle.

The engine system, 1 includes an internal combustion engine, generally depicted at 2, which includes an intake manifold 3 and an exhaust manifold 4. A plurality of combustion cylinders are provided within the engine 2 and are fluidly coupled to both the intake manifold 3 and the exhaust manifold 4. During operation of the engine system 1, charge air and recirculated exhaust gas are received into the intake manifold 3 of the engine 2 as a mixed gas flow 16. Liquid or gaseous fuel (not shown) is combined with the mixed gas flow 16, and the combined fluids are combusted within the combustion cylinders to produce useful power. The resulting exhaust gas is subsequently removed from the engine 2 by way of the exhaust manifold 4. The fuel can be introduced to the mixed gas flow by any of the methods known to be used for combustion engines, such as, for example, port injection or direct injection.

The engine system 1 provides two pathways by which the combusted exhaust gas can be removed from the exhaust manifold 4. A first exhaust gas flow path 8 extends between the exhaust manifold 4 and an exhaust turbine 6. The exhaust turbine 6 is part of a turbocharger 5 of the engine system 1. The turbocharger 5 further includes an air compressor 7 which is coupled to the exhaust turbine 6. Exhaust gas traveling along the exhaust gas flow path 8 is received into the exhaust turbine 6 and is non-adiabatically expanded therein from a high-pressure state to a low-pressure state. Energy released by the non-adiabatic expansion of the exhaust gas is converted to mechanical energy within the exhaust turbine 6, which is then used to pressurize incoming charge air within the air compressor 7. The expanded exhaust gas can be subsequently rejected to the ambient environment. An exhaust treatment system is not shown, but is optionally a part of the engine system 1 and can be located along the exhaust gas flow path 8, or downstream of the exhaust turbine 6, or both.

A second exhaust gas flow path 15 extends between the exhaust manifold 4 and an inlet 11 of a flow mixer 9. A portion of the exhaust produced by the engine 2 can be recirculated back to the intake manifold 3 by way of the exhaust gas flow path 15. The amount of exhaust gas that is recirculated along the flow path 15 can be adjusted through a valve 20 arranged along the flow path 15. The valve 20 can be, for example, a butterfly valve with a variable open position to regulate the amount of exhaust gas passing through the valve 20. The extent to which the valve 20 is open to flow can be controlled by an engine controller (not shown) in response to the operating characteristics of the engine system 1.

The incoming charge air that has been pressurized by the air compressor 7 is routed along charge air flow path 13 extending between the outlet of the air compressor 7 and an inlet 10 of the flow mixer 9. As the compressed charge air travels along the charge air flow path 13 it passes through a charge air heat exchanger 14 arranged along the charge air flow path 13. While passing through the charge air heat exchanger 14, the temperature of the compressed charge air, which is typically increased substantially over the ambient temperature by inherent inefficiencies in the compression process as well as by heat transfer from the exhaust within the turbocharger 5, is decreased through the transfer of heat energy from the charge air to a cooling flow 18. The cooling flow 18 can be a flow of ambient cooling air, or a flow of liquid such as engine coolant or refrigerant, or some other type of cooling flow known in the art. Both air-cooled and liquid-cooled charge air coolers of a type that would be suitable for the charge air heat exchanger 14 of the system 1 are known in the art. In some especially preferable embodiments the charge air heat exchanger 14 is constructed of an aluminum alloy, allowing for a low weight and material cost solution.

While the turbocharger 5 is depicted as a single stage turbocharger, it should be understood that in some embodiment a multi-stage turbocharger might be employed to similar effect. Such a multi-stage turbocharger can optionally include one or more intercoolers arranged between stages of air compression in order to remove heat from the charge air.

The incoming charge air and the recirculated exhaust gas are combined within the mixer 9 and exit the mixer 9 by way of an outlet 12 of the mixer 9. A mixed gas flow path extends between the outlet 12 and the intake manifold 3 to deliver the incoming charge air and the recirculated exhaust gas to that intake manifold 3 as a premixed flow.

No exhaust gas heat exchangers are located along the exhaust gas flow path 15, so that the recirculated exhaust gas is delivered to the mixer 9 in a substantially uncooled condition. It should be understood that some cooling of the exhaust gas will occur due to natural convection from the valve 20 and from piping along the exhaust gas flow path 15 due to the extremely elevated temperature of the exhaust gas, so that some minor cooling of the exhaust gas is bound to occur between the exhaust manifold 4 and the mixer 9. However, owing to the absence of any heat exchanger along the exhaust gas flow path 15, the recirculated exhaust gas is still at nearly the exhaust manifold temperature upon reaching the mixer 9. By way of example, the recirculated exhaust gas temperature may decrease from an exhaust manifold temperature of around 700° C. to a temperature of around 650° C. at the inlet 11 of the mixer 9.

The incoming charge air, having been cooled in the charge air heat exchanger 14, reaches the flow mixer 9 at a substantially lower temperature than the recirculated exhaust gas. By way of example, when the cooling flow 18 is engine coolant at a typical operating temperature of around 100° C., the incoming charge air can be reduced to a temperature of around 125° C. with little difficulty. Once mixed within the flow mixer 9, the temperature of the mixed recirculated exhaust gas and charge air is homogenized to a mixed gas temperature that is between the temperature of the recirculated exhaust gas and the temperature of the cooled charge air. In some preferable embodiments the mixed gas temperature at the outlet 12 of the mixer is below 300° C., and in some especially preferable embodiments is below 250° C.

The mixed gas is delivered to the engine intake manifold 3 along a mixed gas flow path 16 extending between the outlet 12 of the mixer 9 and the intake manifold 3. A mixed gas heat exchanger 17 is arranged along the mixed gas flow path 16 to reduce the temperature of the mixed gas to an acceptably low level prior to reaching the intake manifold. A cooling flow 19 is also routed through the mixed gas heat exchanger 17, and heat is rejected from the mixed gas flow to the cooling flow 17 as the two flows pass through the mixed gas heat exchanger 17. In some embodiments the cooling flow 19 is the same as the cooling flow 18 and/or is part of the same cooling flow circuit, while in other embodiments the cooling flows 18 and 19 are distinct. The cooling flow 19 can be a flow of ambient cooling air, or a flow of liquid such as engine coolant or refrigerant, or some other type of cooling flow known in the art.

In some embodiments it can be especially preferable to locate the mixed gas heat exchanger 17 at the front end of the vehicle, allowing for use of ambient ram air as the cooling flow 19. Such an arrangement will enable the mixed gas to be delivered to the intake manifold 3 at a temperature similar to the IMTD that is typically achieved with charge air alone and avoiding the increased intake manifold temperature typically associated with separately cooling recirculated exhaust gas and charge air. In some such embodiments the mixed gas IMTD can be as low as fifteen degrees Celsius, and in some particularly preferable embodiments as low as ten degrees Celsius. The charge air heat exchanger 14 in such an arrangement can liquid cooled, so that the mixed gas heat exchanger 17 can occupy the space at the front of the vehicle that is normally occupied by an air-cooled charge air cooler.

In some preferable embodiments the mixed gas heat exchanger is constructed of an aluminum alloy, and the mixed gas temperature entering the mixed gas heat exchanger is controlled to a sufficiently low temperature to allow for entry of the mixed gas into an aluminum mixed gas heat exchanger 17 without causing damage or fatigue. By way of example, it is known that aluminum heat exchangers can suffer from structural failures when exposed to fluid flows in excess of around 300° C. By maintaining the mixed gas temperature below such a temperature (e.g. by pre-cooling the charge air sufficiently in the charge air heat exchanger 14 prior to mixing with the high temperature recirculated exhaust gas) the need for any heat exchangers constructed from costly and heavy high-temperature-capable materials such as stainless steel can advantageously be avoided in the engine system 1.

Figure 3:
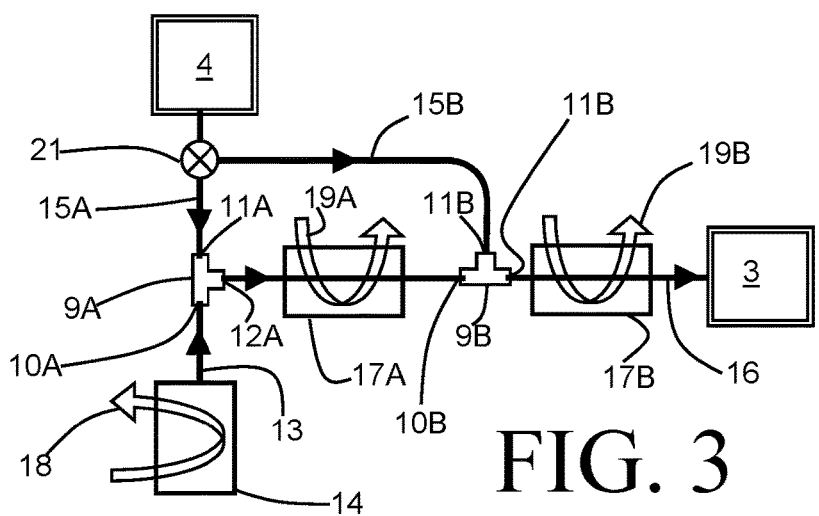
FIG. 3 is a schematic diagram showing an alternative arrangement of a portion of the engine system of FIG. 2.

Turning now to FIG. 3, an alternative arrangement of mixed gas heat exchangers along the mixed gas flow path 16 is illustrated. In place of the single mixed gas heat exchanger 17 of the embodiment of FIG. 2, two mixed gas heat exchangers 17A and 17B are serially arranged along the mixed gas flow path 16. In addition, a second mixer 9B is provided, and has a first inlet 11B and an outlet 12B arranged along the mixed gas flow path 16. The first inlet 11B receives the mixed gas flow after it has passed through the first mixed gas heat exchanger 17A, and the second mixed gas heat exchanger 17B receives mixed gas from the mixer outlet 12B. The embodiment of FIG. 3 provides two parallel flow paths for recirculated exhaust gas. A first recirculated exhaust gas flow path 15A extends from the exhaust manifold 4 to an inlet 11A of a first mixer 9A, while a second recirculated exhaust gas flow path 15B extends form the exhaust manifold 4 to the second inlet 11B of the second mixed 9B. A proportioning valve 21 is provided along both of the recirculated exhaust gas flow paths 15A, 15B to proportion recirculated exhaust gas between the two flow paths 15A, 15B. The recirculated exhaust gas flow paths 15A and 15B are thus coextensive between the exhaust manifold 4 and the proportioning valve 21, thereby still allowing for a single valve 20 to control the total amount of exhaust gas being recirculated. In some embodiments, the valves 20 and 21 can be integrated into single valve, whereas in other embodiments they can remain as two separate valves.

The embodiment of FIG. 3 allows for only a portion of the total recirculated exhaust gas (i.e. the portion that flow along the recirculated exhaust flow path 15A to the mixer 9A) to be initially combined with the cooled charge air received into the mixer through mixer inlet 10A, thereby resulting in a reduced mixed gas flow temperature at the inlet of mixed gas heat exchanger 17A. The remainder of the recirculated exhaust gas is then mixed into the mixed gas after the mixed gas has been sufficiently cooled in mixed gas heat exchanger 17A to prevent undesirably high mixed gas temperature entering the mixed gas heat exchanger 17B. In some embodiments this proportioning of recirculated exhaust gas can be achieved with a fixed orifice sizes for the proportioning valve 21, while in other embodiments the valve 21 can be actively controlled by, for example, the engine controller. In some embodiments it may be preferable for the valve 21 to operate in response to a measured mixed gas temperature between the outlet 12A of the mixer 9A and the mixed gas inlet of the heat exchanger 17A so that the mixed gas temperature at that location can be precisely controlled.

Cooling flows 19A and 19B are depicted for the two mixed gas heat exchangers 17A and 17B respectively. It should be understood that these cooling flows 19A and 19B can be a common cooling flow and/or part of the same cooling flow circuit. Alternatively, the flows 19A and 19B can be separate and distinct cooling flows. Additionally, one or both of the cooling flows 19A and 19B can optionally be the same as the cooling flow 18. In one preferable embodiment both the cooling flow 18 and the cooling flow 19A are part of an engine coolant flow circuit, while the cooling flow 19B is ambient air. Such an arrangement can result in a relatively compact liquid-cooled heat exchanger 17A (cooled, for example, by engine coolant as the cooling flow 19A) to reject the majority of the heat from the mixed gas, and a second air-cooled heat exchanger 17B to reduce the temperature of the mixed gas to as low a temperature as possible (using ambient air as the cooling flow 17B) prior to delivery of the mixed gas to the intake manifold 3.

In yet another variation of the embodiment of FIG. 3, the proportioning valve 21 and the second flow mixer 9B can be eliminated while maintaining two separate mixed gas heat exchangers 17A and 17B along the mixed gas flow path 16. Such an alternative arrangement may be desirable when there is no concern over the mixed gas temperature resulting from mixing all of the recirculated exhaust gas with the cooled charge air, but it is still desirable to maintain two separate cooling flows 19A and 19B.

Figure 4:
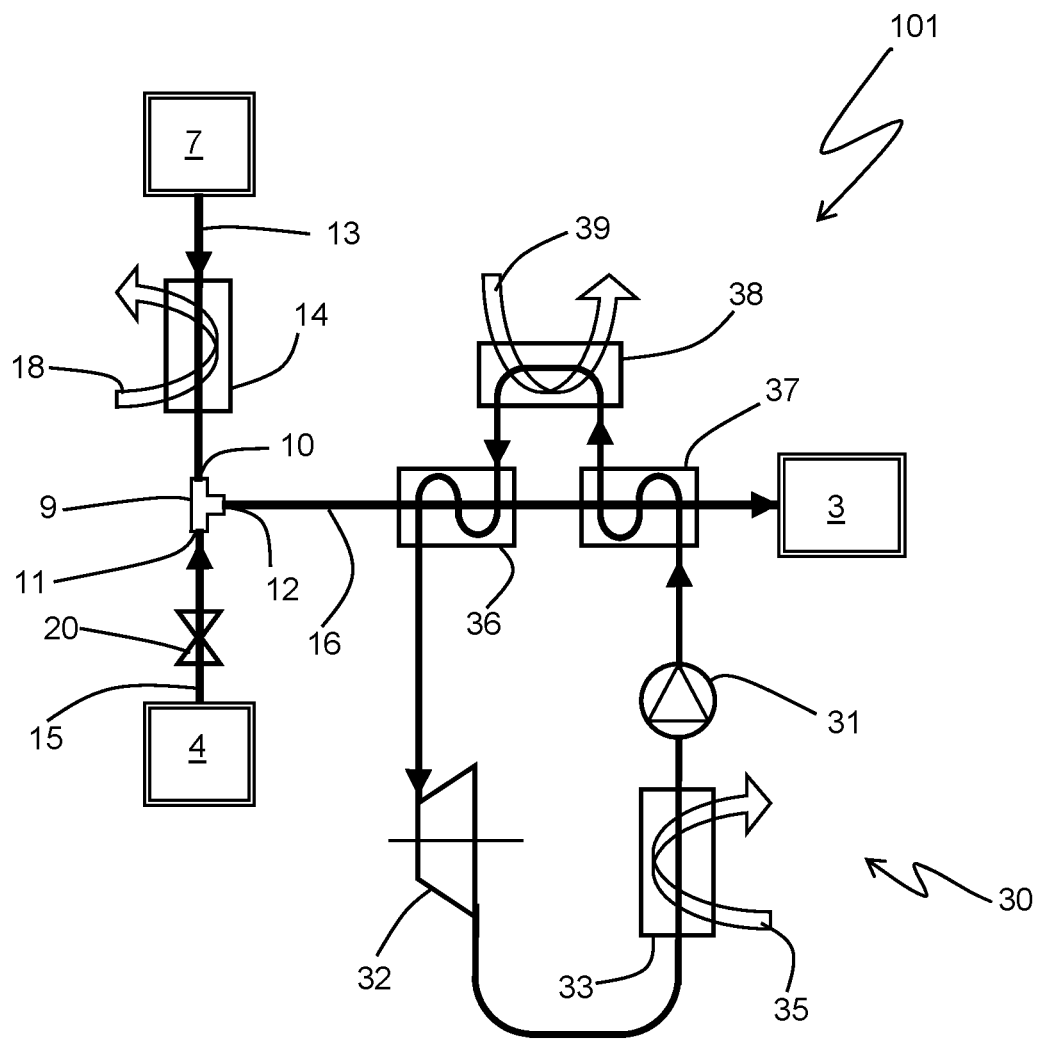
FIG. 4 is a schematic diagram of an engine system according to another embodiment of the present invention.

Yet another alternative embodiment is depicted in FIG. 4, and includes a waste heat recovery bottoming system 30 as part of an engine system 101. The engine system 101 is similar, in general, to the engine system 1 of FIGS. 2 and 3, except that the mixed gas heat exchangers have been replaced with first and second mixed gas heat exchangers 36 and 37 that are also part of the waste heat recovery system 30.

The waste heat recovery system 30 is depicted in FIG. 4 as a Rankine cycle system, although it should be understood that other types of bottoming systems (such as, for example, a Brayton cycle system) could be used instead. The Rankine cycle system 30 includes a working fluid feed pump 31 to propel a liquid working fluid through the system. The working fluid is vaporized and superheated before being non-adiabatically expanded in an expander 32, whereby useful work can be extracted. A condenser 33 is additionally provided as part of the system 30 so that the expanded vapor working fluid can be returned to a liquid state at the pump through the rejection of heat to a cooling flow 35 (for example, ambient air) passing through the condenser 33.

The working fluid is heated and vaporized in the mixed gas heat exchangers 36 and 37 and, optionally, in one or more additional heat exchangers 38 wherein waste heat from other sources 39 of the engine system can be recovered. By way of example only, the waste heat flow 39 can be the non-recirculated exhaust gas downstream of the turbocharger 5, or lubricating oil of the engine, or engine coolant. The working fluid can advantageously be directed through the mixed gas heat exchangers 36 and 37 in reverse order to that in which the mixed gas traverses those heat exchangers, i.e. first through mixed gas heat exchanger 37 and subsequently through mixed gas heat exchanger 36 as shown. In doing so, the thermodynamic potential of the system 30 is maximized and the mixed gas temperature into the intake manifold is minimized by taking advantage of the liquid working fluid having a low temperature and high specific heat capacity being in heat exchange relationship with the coolest mixed gas, and the superheated working fluid having a high temperature and lower specific heat capacity being in heat exchange relationship with the hottest mixed gas.

In some especially preferable embodiments, the system 101 is operated so that the working fluid remains in a liquid state through the entirety of the mixed gas heat exchanger 37, and is subsequently mostly or fully vaporized in the heat exchanger 38 using a separate waste heat flow 39. The working fluid is then delivered to the mixed gas heat exchanger 36 to receive additional heat from the hotter mixed gas in order to superheat the working fluid.

The effectiveness of the Rankine cycle waste heat recovery system 30 can be maximized by reducing the low-side (i.e. downstream of the expansion device 32) pressure as much as possible. This pressure is primarily dependent on the temperature to which the working fluid in the condenser 33. Consequently, it can be especially advantageous the locate the condenser 33 at the front of the vehicle, where it can receive ram air as the cooling flow 35, thus replacing the air-cooled charge air cooler that is frequently occupying that position. The working fluid is then received into the mixed gas heat exchanger 37 at only a slightly higher temperature than the ambient, thus still allowing for low gas temperatures in the intake manifold 3.

Figure 5:
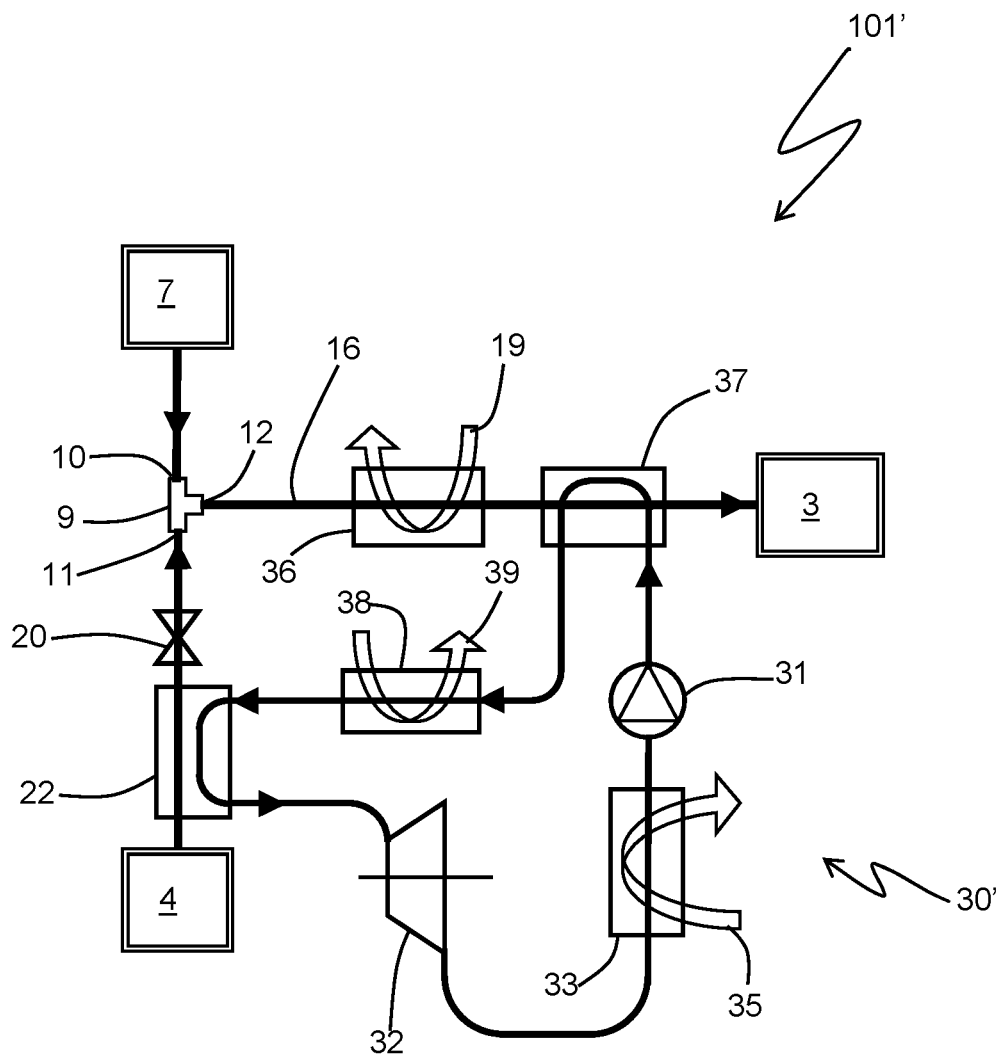
FIG. 5 is a schematic diagram of an engine system according to yet another embodiment of the present invention.

FIG. 5 depicts an alternative embodiment of an engine system 101'. The engine system 101' includes a Rankine cycle bottoming system 30' that is generally similar to the system 30 previously described, but with some modifications to the working fluid routing through heat exchangers. The liquid working fluid received from the pump 31 is still routed first through the lower temperature mixed gas heat exchanger 37, but the higher temperature mixed gas heat exchanger 36 is cooled using a separate cooling flow 19. The working fluid again optionally receives heat from another waste heat stream 39 in a separate heat exchanger 38, and is subsequently delivered to an exhaust gas recirculation heat exchanger 22 to be superheated. The rejection of heat from the recirculated exhaust gas to the working fluid sufficiently lowers the temperature of the recirculated exhaust gas so that it can be combined with uncooled charge air in the mixer 98 while still maintaining an acceptably low temperature of mixed gas entering the heat exchanger 36 to allow for that heat exchanger to be constructed of lower-cost alloys such as aluminum alloys. Alternatively, aspects of the embodiments of FIG. 4 and the embodiment of FIG. 5 can be combined, so that superheating of the working fluid is accomplished in the charge air cooler 14 in place of in an exhaust gas recirculation heat exchanger 22, thereby again avoiding the need for a heat exchanger capable of withstanding exhaust temperatures.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. An engine system with exhaust gas recirculation, comprising:
    a combustion engine having an intake manifold and an exhaust manifold;
    a turbocharger including an exhaust turbine and an air compressor coupled to the exhaust turbine;
    an exhaust flow path extending between the exhaust manifold and an inlet of the exhaust turbine;
    a first flow mixer having a first inlet, a second inlet, and an outlet;
    a charge air flow path extending between an outlet of the air compressor and the first inlet of the first flow mixer;
    a first heat exchanger located along the charge air flow path to transfer heat from compressed charge air traveling along the charge air flow path from the air compressor to the first flow mixer;
    a first exhaust gas recirculation flow path extending between the exhaust manifold and the second inlet of the flow mixer, wherein the first exhaust gas recirculation flow path does not extend through any heat exchangers;
    a mixed gas flow path extending between the outlet of the first flow mixer and the intake manifold;
    a first mixed gas heat exchanger located along the mixed gas flow path,
    a second flow mixer having a first inlet, a second inlet, and an outlet, the first inlet and the outlet of the second flow mixer being located along the mixed gas flow path between the first mixed gas heat exchanger and the intake manifold;
    a second exhaust gas recirculation flow path extending between the exhaust manifold and the second inlet of the second flow mixer, wherein the second exhaust gas recirculation flow path does not extend through any heat exchangers; and
    a second mixed gas heat exchanger located along the mixed gas flow path between the outlet of the second flow mixer and the intake manifold.

2. The engine system of claim 1, wherein mixed gas flowing through the first mixed gas heat exchanger is cooled by a first coolant flow passing through the first mixed gas heat exchanger and wherein mixed gas flowing through the second mixed gas heat exchanger is cooled by a second coolant flow passing through the second mixed gas heat exchanger, the second coolant flow being different than the first coolant flow.

3. The engine system of claim 1, further comprising a valve located along both the first and the second exhaust gas recirculation flow paths to proportion recirculated exhaust gas between the second inlet of the first flow mixer and the second inlet of the second flow mixer.

4. The engine system of claim 3, wherein the valve operates in response to a mixed gas temperature between the outlet of the first flow mixer and the first mixed gas heat exchanger.

5. An engine system with exhaust gas recirculation, comprising:
a combustion engine having an intake manifold and an exhaust manifold;
a turbocharger including an exhaust turbine and an air compressor coupled to the exhaust turbine;
an exhaust flow path extending between the exhaust manifold and an inlet of the exhaust turbine;
a flow mixer having a first inlet, a second inlet, and an outlet;
a charge air flow path extending between an outlet of the air compressor and the first inlet of the flow mixer;
a first heat exchanger located along the charge air flow path to transfer heat from compressed charge air traveling along the charge air flow path from the air compressor to the flow mixer;
an exhaust gas recirculation flow path extending between the exhaust manifold and the second inlet of the flow mixer, wherein the exhaust gas recirculation flow path does not extend through any heat exchangers;
a mixed gas flow path extending between the outlet of the flow mixer and the intake manifold; and
a mixed gas heat exchanger located along the mixed gas flow path to transfer heat from a mixed gas traveling along the mixed gas flow path,
wherein the mixed gas heat exchanger is one of a plurality of mixed gas heat exchangers located along the mixed gas flow path.

6. The engine system of claim 5, wherein at least some of the plurality of mixed gas heat exchangers are additionally located along a portion of a common heat receiving fluid circuit, the common heat receiving fluid circuit being part of a waste heat recovery bottoming cycle of the engine system.

7. The engine system of claim 6, wherein the plurality of mixed gas heat exchangers includes a first mixed gas heat exchanger and a second mixed gas heat exchanger, wherein the first mixed gas heat exchanger is arranged upstream of the second mixed gas heat exchanger along the mixed gas flow path and wherein the first mixed gas heat exchanger is arranged downstream of the second mixed gas heat exchanger along the common heat receiving fluid circuit.

8. The engine system of claim 7, further comprising an additional waste heat recovery heat exchanger arranged along the common heat receiving fluid circuit between the first mixed gas heat exchanger and the second mixed gas heat exchanger.

9. A method of operating an engine system comprising:
receiving a flow of uncooled exhaust gas from an exhaust manifold of the engine system;
splitting the flow of uncooled exhaust gas into an un-recirculated portion and a recirculated portion;
recovering energy from the un-recirculated portion to pressurize a flow of charge air;
rejecting heat from the pressurized flow of charge air to cool the charge air;
combining the cooled charge air with at least some of the recirculated portion of uncooled exhaust gas to form a mixed gas;
rejecting heat from the mixed gas to cool the mixed gas by passing the mixed gas through a mixed gas heat exchanger, by passing a flow of ambient air through the mixed gas heat exchanger, and by transferring heat from the mixed gas to the flow of ambient air within the mixed gas heat exchanger; and
delivering the cooled mixed gas to an intake manifold of the engine system,
wherein the mixed gas heat exchanger is a terminal one of a plurality of mixed gas heat exchangers through which the mixed gas passes before being delivered to the intake manifold.

10. A method of operating an engine system comprising:
receiving a flow of uncooled exhaust gas from an exhaust manifold of the engine system;
splitting the flow of uncooled exhaust gas into an un-recirculated portion and a recirculated portion;
recovering energy from the un-recirculated portion to pressurize a flow of charge air;
rejecting heat from the pressurized flow of charge air to cool the charge air;
combining the cooled charge air with at least some of the recirculated portion of uncooled exhaust gas to form a mixed gas;
measuring a temperature of the mixed gas after combining the cooled charge air with at least some of the recirculated portion of uncooled exhaust gas to form the mixed gas;
adjusting the amount of the recirculated portion of uncooled exhaust gas being combined with the cooled charge air in order to regulate the measured temperature of the mixed gas;
rejecting heat from the mixed gas to cool the mixed gas after adjusting the amount of the recirculated portion of uncooled exhaust gas being combined with the cooled charge air;
combining any remaining recirculated portion of uncooled exhaust gas with the mixed gas after rejecting heat from the mixed gas; and
delivering the cooled mixed gas to an intake manifold of the engine system.

11. The method of claim 10, further comprising rejecting additional heat from the charge air and recirculated portion of uncooled exhaust gas after the step of combining any remaining recirculated portion of uncooled exhaust gas with the mixed gas.

12. The method of claim 10, further comprising:
pressurizing a flow of working fluid;
heating the flow of working fluid to form a superheated vapor working fluid;
expanding the superheated vapor working fluid to recover energy therefrom; and
condensing the expanded working fluid to return it to a liquid state, wherein a least a portion of the heat used to form the superheated vapor working fluid is heat rejected from the mixed gas to cool the mixed gas.

13. The method of claim 12, wherein the step of rejecting heat from the mixed gas to cool the mixed gas includes flowing the mixed gas through a plurality of heat exchangers and wherein the step of heating the flow of working fluid to form a superheated vapor working fluid includes flowing the working fluid through at least one of the plurality of heat exchangers.

14. The method of claim 13:
wherein flowing the mixed gas through the plurality of heat exchangers comprises passing the mixed gas successively through a first and then a second heat exchanger, and
wherein flowing the working fluid through at least one of the plurality of heat exchangers comprises, passing the working fluid into the second heat exchanger in order to heat the working fluid and cool the mixed gas;

receiving the working fluid from the second heat exchanger in a partially heated condition;

passing the working fluid into the first heat exchanger;

fully heating the working fluid in the first heat exchanger using heat from the mixed gas; and receiving the working fluid from the first heat exchanger in a superheated vapor state.

15. The method of claim 14, wherein flowing the working fluid through at least one of the plurality of heat exchangers further comprises passing the working fluid through a third heat exchanger after passing the working fluid through the second heat exchanger but before passing the working fluid through the first heat exchanger in order to heat the working fluid, wherein the working fluid is heated in the third heat exchanger using un-recirculated exhaust gas or engine coolant.

16. The engine system of claim 5, wherein the first heat exchanger is a liquid-cooled heat exchanger and is additionally located along a portion of an engine coolant circuit of the engine system.

17. The engine system of claim 5, wherein the mixed gas heat exchanger is an air-cooled heat exchanger.

18. The method of claim 9, wherein rejecting heat from the mixed gas includes cooling the mixed gas to an intake manifold temperature differential of no more than fifteen degrees Celsius.

19. The method of claim 10, wherein rejecting heat from the mixed gas includes cooling the mixed gas to an intake manifold temperature differential of no more than fifteen degrees Celsius.

* * * * *